United States Patent
Frank

(10) Patent No.: US 9,318,990 B2
(45) Date of Patent: Apr. 19, 2016

(54) REDUNDANT WINDING CONNECTIONS FOR MULTIPHASE ELECTRIC MACHINES

(71) Applicant: ABB Research Ltd., Zurich (CH)

(72) Inventor: Nicolas W. Frank, Raleigh, NC (US)

(73) Assignee: ABB RESEARCH LTD., Zurich (CH)

( * ) Notice: Subject to any disclaimer, the term of this patent is extended or adjusted under 35 U.S.C. 154(b) by 389 days.

(21) Appl. No.: 13/785,163

(22) Filed: Mar. 5, 2013

(65) Prior Publication Data

US 2014/0103850 A1    Apr. 17, 2014

Related U.S. Application Data

(60) Provisional application No. 61/714,010, filed on Oct. 15, 2012.

(51) Int. Cl.
*H02K 3/28* (2006.01)
*H02P 25/22* (2006.01)
*H02K 15/00* (2006.01)
*H02K 11/00* (2006.01)

(52) U.S. Cl.
CPC ........ *H02P 25/22* (2013.01); *H02K 3/28* (2013.01); *H02K 11/0073* (2013.01); *H02K 2213/06* (2013.01)

(58) Field of Classification Search
CPC ................................. H02K 3/04; H02K 3/28
USPC ................ 310/179, 184, 198, 199–208
See application file for complete search history.

(56) References Cited

U.S. PATENT DOCUMENTS

| | | | |
|---|---|---|---|
| 4,628,245 A * | 12/1986 | Quayle | 310/198 |
| 4,751,448 A * | 6/1988 | Auinger | 318/773 |
| 6,831,430 B2 | 12/2004 | Edelson | |
| 7,075,265 B2 | 7/2006 | Endelson | |
| 2003/0057789 A1 | 3/2003 | Buening et al. | |
| 2008/0272669 A1 * | 11/2008 | Mohle et al. | 310/198 |
| 2010/0066194 A1 | 3/2010 | Wolf et al. | |

OTHER PUBLICATIONS

Sadeghi et al, "Wide Operational Speed Range of Five-Phase Permanent Magnet Machines by Using Different Stator Winding Configurations," IEEE, pp. 1-11 (2011).

* cited by examiner

*Primary Examiner* — Michael Andrews
(74) *Attorney, Agent, or Firm* — Jenkins, Wilson, Taylor & Hunt, P.A.

(57) ABSTRACT

Redundant winding connections for multiphase electric machines are disclosed. According to one aspect, a multiphase machine having redundant winding connections includes: a first set of N coils operating as a first winding group, wherein each coil in the first winding group operates at a different phase from the other coils in the first winding group and wherein N is an integer greater than three; a second set of N coils separate from the first set and operating as a second winding group, wherein each coil in the second winding group operates at a different phase from the other coils in the second winding group and wherein the failure of one of the coils in the first winding group does not affect the function of the second winding group.

14 Claims, 16 Drawing Sheets

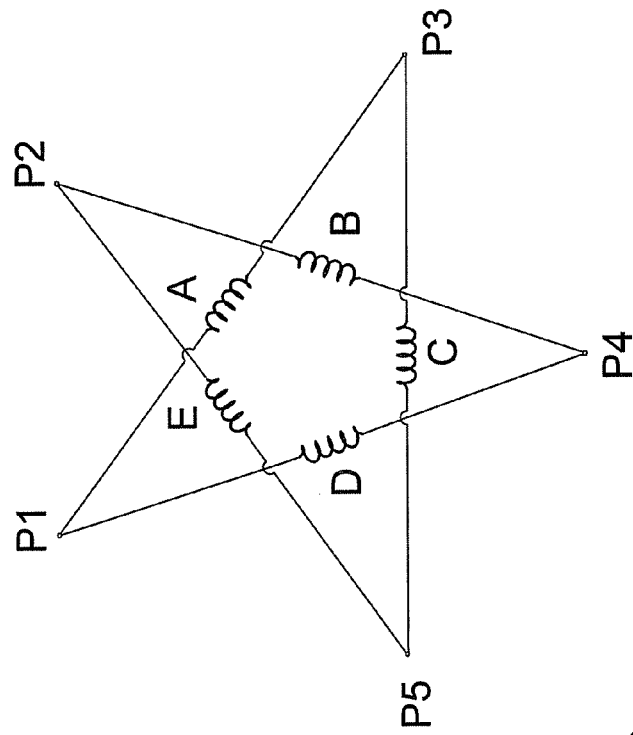
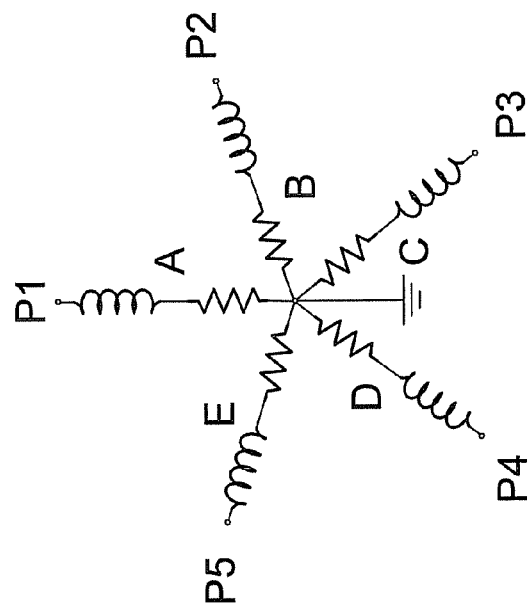
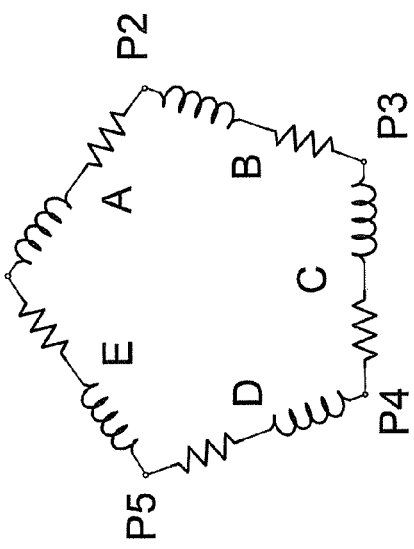
FIG. 2C
FIG. 2B
FIG. 2A

REDUNDANT WINDING CONNECTIONS FOR MULTIPHASE ELECTRIC MACHINES

TECHNICAL FIELD

The subject matter described herein relates to methods and systems for multiphase electric machines. More particularly, the subject matter described herein relates to redundant winding connections for multiphase electric machines.

PRIORITY CLAIM

This application claims the benefit of U.S. Provisional Patent Application Ser. No. 61/714,010, filed Oct. 15, 2012; the disclosure of which is incorporated herein by reference in its entirety.

BACKGROUND

As used herein, an electric, electrical, or electronic machine (herein referred to simply as a "machine") refers to any electromechanical device. Example machines include motors and generators. A single machine may be a motor, a generator, or operate as either a motor or a generator. When operating as a motor, a machine converts electrical energy into mechanical energy, and when operating as generator, a machine converts mechanical energy into electrical energy. Thus, it is understood that when a machine is said to "operate using" a certain type of power, it is meant that the machine is supplied with that type of power in motor mode and/or produces that type of power in generator mode.

As used herein, the term "synchronous machine" refers to a machine that operates using alternating current (AC) rather than direct current (DC). The speed of a synchronous motor, for example, is directly proportional to the frequency of the AC input. A synchronous motor that is supplied with a single AC input (or multiple AC inputs that have the same phase) is referred to as a "single phase" machine. In a single phase synchronous machine, all coils operate at the same phase. In a two-phase synchronous machine, some coils operate at one phase and other coils operate at another phase, usually 180 degrees from the first phase. Each phase may supply more than one coil.

One common type of synchronous machine is known as a "three-phase" machine because it operates using three-phase power, e.g., a three-phase motor is provided with three distinct AC inputs, each input being 120 degrees apart in phase from the other inputs.

FIGS. 1A and 1B are circuit diagrams illustrating possible coil configurations for a conventional three-phase machine. FIG. 1A illustrates the "Y" or "wye" configuration, and FIG. 1B illustrates the "delta" configuration. In each of FIGS. 1A and 1B, there are three power supplies, P1, P2, and P3, each of which produces an AC voltage that is 120 degrees apart in phase from the other two power supplies. The label "Px" where x=1 to N will hereinafter be used to refer to an AC voltage having one of N different phases, where each power supply is 360/N degrees apart from the power supplies that are next closest in phase. In each of FIGS. 1A and 1B, the three phase machine has three sets of coils, one set for each phase. The three sets are labeled A, B, and C, respectively.

The wye configuration can be considered a specific example of a general topology herein referred to as a "star", in which all coils have one end tied to a common node, such as voltage ground. The delta configuration can be considered a specific example of a general topology herein referred to as a "polygon", in which adjacent coils are connected in series in a single loop, with a power supply connected to each junction between two coils. The star and polygon topologies have different operating characteristics. For example, for a three phase 100V AC power supply, the maximum voltage across any coil in the star configuration is the maximum voltage measured between the power supply and ground, i.e., 100 Volts. The maximum voltage across any coil in the polygon configuration is the maximum voltage measured between one phase of the power supply and another phase of the power supply, i.e., ~173 Volts.

Three phase machines have only two distinct coil configurations: wye and delta ("star" and "polygon".) Changing the coil positions or the power connections does not create a new topology. In FIG. 1B, for example, the positions of coils $B_1$ and $C_1$ could be swapped, or power supply P1 could be swapped with power supply P3, but the topology (and performance) would not change. That is, however the coils and power supplies are rearranged, the maximum voltage across any coil in the three phase polygon configuration will not change. As will be seen below, the same is not true of multiphase machines.

As used herein, the term "multiphase" machine refers to machines that use or generate electricity of more than three phases. Example multiphase machines include five-phase machines, seven-phase machines, and so on. Multiphase machines may have even numbers of phases as well, although this is not common. Thus, as used herein, the term "multiphase" expressly excludes conventional three-phase machines.

FIGS. 2A, 2B, and 2C are circuit diagrams illustrating possible coil winding configurations for a conventional multiphase machine having five phases. FIG. 2A illustrates a five-phase star, FIG. 2B illustrates a five-phase polygon, and FIG. 2C illustrates what is herein referred to as an "N-angle" topology, e.g., the "pentangle" topology shown in FIG. 2C. Note that the difference between the pentagon configuration in FIG. 2B and the pentangle configuration in FIG. 2C is that in the polygon, one end of each coil is tied to one of the power supply phases and the other end of each coil is tied to another power supply that is closest in phase to the first power supply. For example, in FIG. 2B, one end of coil A is tied to P1 and the other end of coil A is tied to P2, which is 72 degrees apart in phase from P1.

In contrast, in the star configuration, one end of each coil is tied to one of the power supply phases and the other end of the each coil is tied to another power supply that is NOT closest in phase to the first power supply. For example, in FIG. 2C, one end of coil A is tied to P1 and the other end of coil A is tied to P3, which is 144 degrees apart in phase from P1. Five-phase machines have only three possible configurations: star, pentagon, and pentangle. For a 100V 5-phase power supply, the maximum voltage across each coil is 100 Volts for a star configuration, ~118 Volts for a pentagon configuration, and ~190 Volts for a pentangle configuration.

Multiphase machines have several advantages over conventional three-phase machines. For example, the failure of one phase of a three-phase machine, such as a wiring failure of that phase's coil or coils, may render the machine inoperable, e.g., because the remaining phases don't have the power to drive the load, or because the motor operation is unacceptably unbalanced. The failure of one phase of a seven-phase machine, on the other hand, may leave the machine with a sufficient number of coils and power. Likewise, the remaining six phases may be unbalanced, but within acceptable levels.

Additionally, in multiphase machines, the possibilities for the winding connections are greatly expanded from that of three-phase machines. For example, in a five-phase machine, there are three possibilities if the winding connection must form one group: the star, pentagon, and pentangle. Likewise, there are four possibilities for a single group winding connection in a seven-phase machine, i.e., star, heptagon, and two heptangles, each providing a different maximum voltage across each coil.

Since most public and private power grids provide three-phase power, multiphase machines must of necessity use three-phase power converted into multiphase power. This is typically done by rectifying the three-phase AC power to produce DC power, then using an inverter to convert the DC power to multiphase AC power. Devices that perform one or both of these steps to produce multiphase AC power are herein referred to as "converters." A benefit of this necessity of using a converter to produce multiphase power is that multiphase machines are decoupled from the power grid.

Thus, multiphase machines have seen much development in the last ten years due to the development of converters which decouple machines from the grid, and the desire for higher performance machines within the same volume.

There are disadvantages associated with conventional multiphase machines, however. Perhaps because conventional multiphase machines tolerate the loss of a phase winding, conventional multiphase machines do not exhibit full winding redundancy. For example, multiphase arrangements with multi-star configurations have not been seen in the art. For this reason, conventional multiphase machines are not well suited for applications which are very sensitive to changes in total power or changes in balance or which require very high reliability.

Accordingly, in light of these disadvantages associated with conventional multiphase machines, there exists a need for redundant winding connections for multiphase electric machines.

SUMMARY

According to one aspect, a multiphase machine having redundant winding connections includes: a first set of N coils operating as a first winding group, wherein each coil in the first winding group operates at a different phase from the other coils in the first winding group and wherein N is an integer greater than three; a second set of N coils separate from the first set and operating as a second winding group, wherein each coil in the second winding group operates at a different phase from the other coils in the second winding group and wherein the failure of one of the coils in the first winding group does not affect the function of the second winding group.

According to another aspect, the subject matter described herein includes a method for operating a multiphase machine having redundant winding connections. The method includes, at a machine having a first set of N coils operating as a first winding group, wherein each coil in the first winding group operates at a different phase from the other coils in the first winding group and wherein N is an integer greater than three, a second set of N coils separate from the first set and operating as a second winding group, wherein each coil in the second winding group operates at a different phase from the other coils in the second winding group and wherein the failure of one of the coils in the first winding group does not affect the function of the second winding group, providing N phases of power to the respective coils in the first set of coils.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIGS. 2A, 2B, and 2C are circuit diagrams illustrating possible coil winding configurations for a conventional multiphase machine having five phases;

DETAILED DESCRIPTION

In accordance with the subject matter disclosed herein, redundant multipolygon winding connections for multiphase electric machines are provided.

Reference will now be made in detail to exemplary embodiments of the present invention, examples of which are illustrated in the accompanying drawings. Wherever possible, the same reference numbers will be used throughout the drawings to refer to the same or like parts.

Figure 1B:
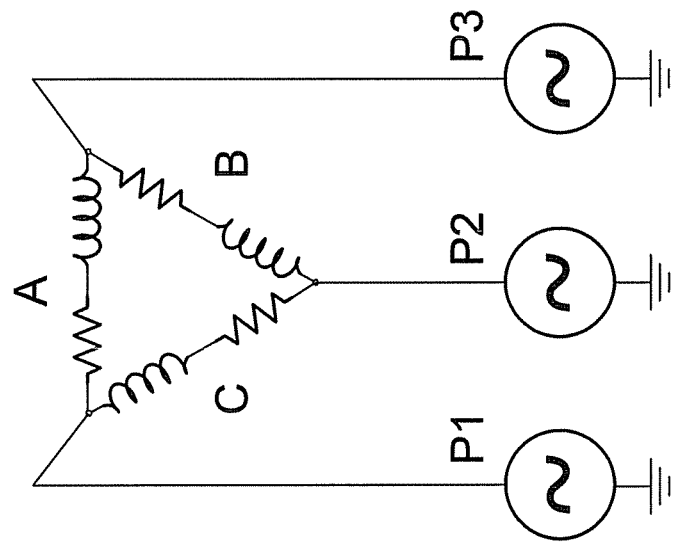
FIGS. 1A and 1B are circuit diagrams illustrating possible coil configurations for a conventional three-phase machine.
Figure 1A:
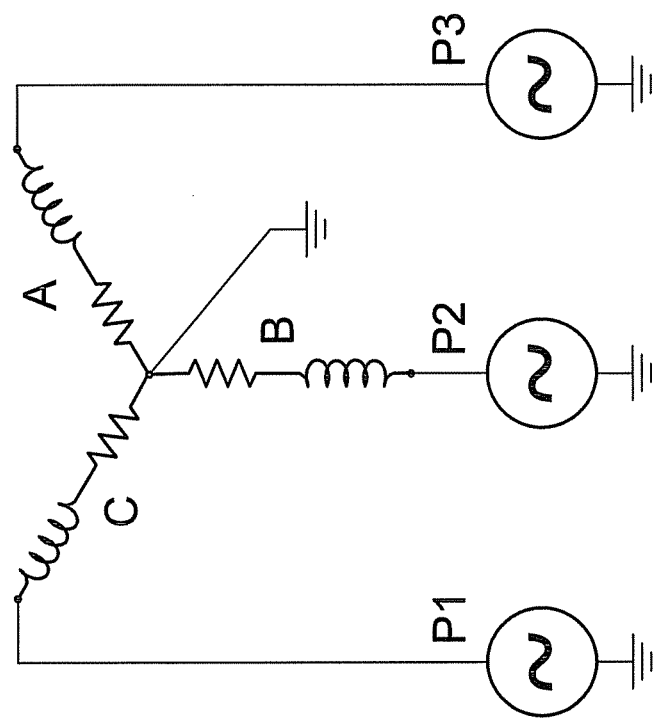
Figure 3:
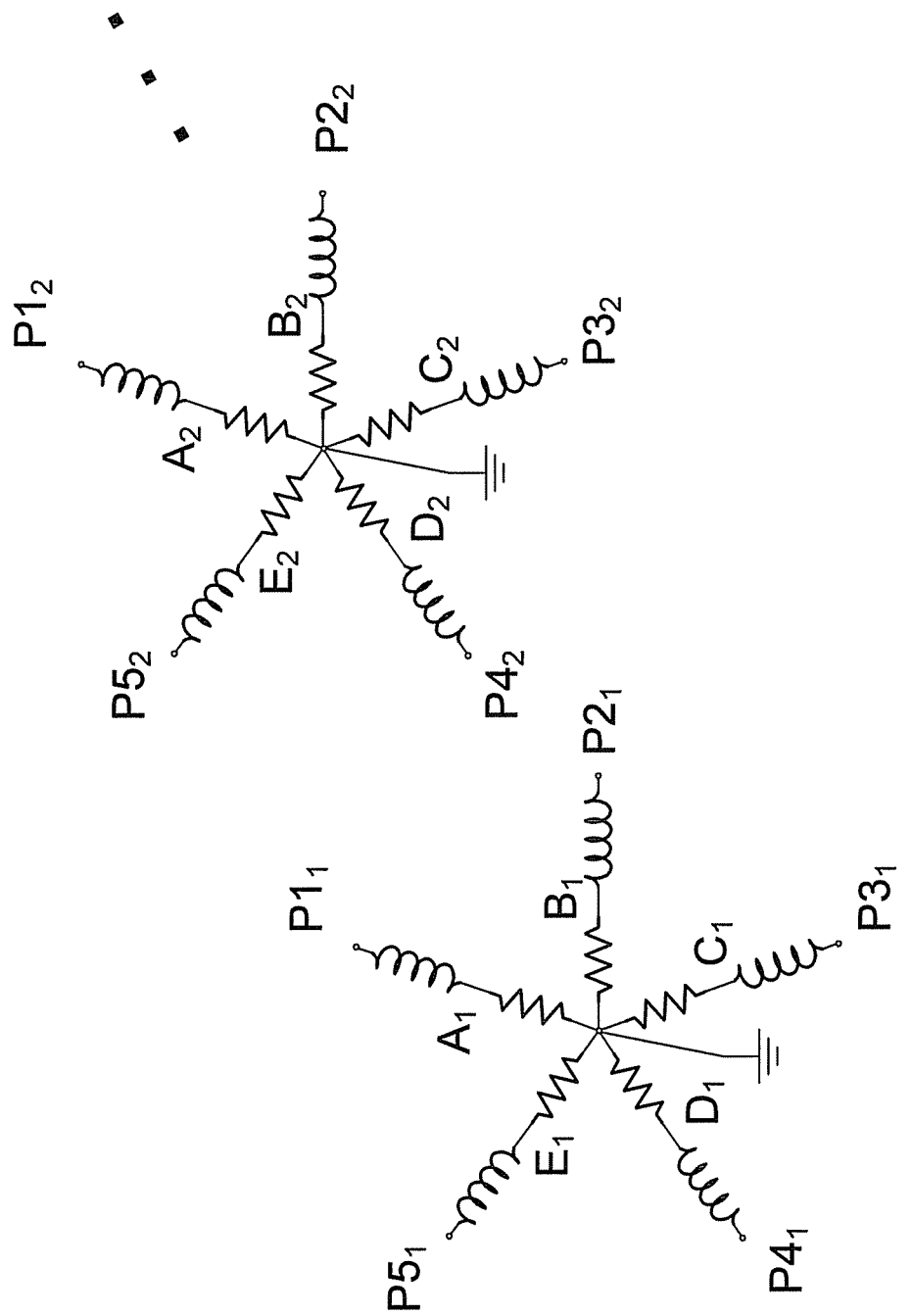
FIG. 3 is a circuit diagram illustrating an exemplary redundant winding connection for multiphase electric machines having five phases according to an embodiment of the subject matter described herein.

FIG. 3 is a circuit diagram illustrating an exemplary redundant winding connection for multiphase electric machines according to an embodiment of the subject matter described herein. FIG. 3 illustrates an embodiment having redundant star winding connections for five-phase electric machines. In the embodiment illustrated in FIG. 3, a first group of windings includes coils $A_1$, $B_1$, $C_1$, $D_1$, and $E_1$, each shown as an inductance in series with a resistance. Each of the five coils $A_1$-$E_1$ has one end connected to a common node, shown in FIG. 3 as a connection to a voltage ground. The other end of each coil is attached to one phase of a five-phase power supply, where each phase of the power supply outputs are labeled $P1_1$, $P2_1$, $P3_1$, $P4_1$, and $P5_1$. A second group of windings includes coils $A_2$, $B_2$, $C_2$, $D_2$, and $E_2$. Each of the five coils $A_2$-$E_2$ also has one end connected to a common node, such as a voltage ground. The other end of coils $A_2$-$E_2$ are connected to power supply outputs $P1_2$, $P2_2$, $P3_2$, $P4_2$, and $P5_2$ respectively. The subject matter described herein is not limited to machines having just two redundant groups of windings and/or power supplies. The principles described herein may be applied to machines having three groups, four groups, and so on.

In one embodiment, power supplies $PN_1$ and $PN_2$ may be the same power supply, i.e., $P1_1$ and $P1_2$ may be the same power supply or at least have the same voltage and phase. In another embodiment, power supplies $PN_1$ and $PN_2$ may be different power supplies or have different voltages and/or phases relative to each other.

In one embodiment, the first and second groups of windings may operate together, e.g., they may be powered and active simultaneously. In this configuration, even if one coil fails, the equivalent coil in the other winding group might be sufficient to allow the machine to continue operating. For example, if coil $C_1$ fails, coil $C_2$ may provide enough power for the machine to continue operating. In one embodiment, the power that is provided to the remaining coils may be reshaped, retimed, or otherwise adjusted to compensate for the failed coil.

In another embodiment, power supplies $PN_1$ and $PN_2$ may be out of phase with each other such that the machine operates as a ten-phase machine, for example. In this configuration, the failure of one coil or power supply phase would leave nine phases remaining, which may be enough to power the machine.

In yet another embodiment, one winding group may act as a backup to another winding group, and is activated only when the primary group fails. For example, in normal operation coils $A_1$-$E_1$ are powered while coils $A_2$-$E_2$ are dormant, e.g., unpowered, tied to ground, or floating. In the case where one or all of coils $A_1$-$E_1$ fail, coils $A_2$-$E_2$ become operational and coils $A_1$-$E_1$ become dormant.

The techniques and configurations described above to accommodate a failed coil or coils may also be applied to accommodate a failed power supply or power supply phase, especially in embodiments where each group of coils has its own power supply. For example, in one embodiment, power supplies $P1_1$ through $P5_1$ are produced or provided by a first converter while power supplies $P1_2$ through $P5_2$ are produced or provided by a second converter. If the first converter fails such that some or all of power supplies $P1_1$ through $P5_1$ fail, the second converter may be provide power to the machine. For example, in configurations where both converters provide power simultaneously, the second converter may continue to provide power to coils $A_2$-$E_2$ while the first set of coils $A_1$-$E_1$ continue to operate using whichever power supplies $P1_1$ through $P5_1$ have not failed.

In configurations where the second converter is engaged only when the first converter fails, the second converter could provide power to the machine by supplying power to all of its coils, in which case the failed converter and its coils may be taken offline or otherwise become dormant. Alternatively, if the first converter partially fails, e.g., one phase of the power supply fails but other phases continue to operate, the second converter may be configured to supply power during the failed phase. This is most easily illustrated in machines that have a star configuration. In FIG. 3, for example, in one embodiment, a first converter supplies $P1_1$ through $P5_1$ and a second converter supplies $P1_2$ through $P5_2$. Should the first converter fail such that power supply $P4_1$ no longer produces the necessary waveform, the second converter could activate power supply $P4_2$ to produce the equivalent waveform. In this example, the machine would continue to operate using coils $A_1$, $B_1$, $C_1$, $D_2$, and $E_1$. Other configurations, situations, and techniques to compensate for a failed coil or power supply/power supply phase are also within the scope of the subject matter described herein. Furthermore, although the techniques herein are described in the context of a machine that is operating as a motor, the subject matter described herein is not so limited. The same principles can be applied to a machine that is operating as a generator as well.

Figure 4:
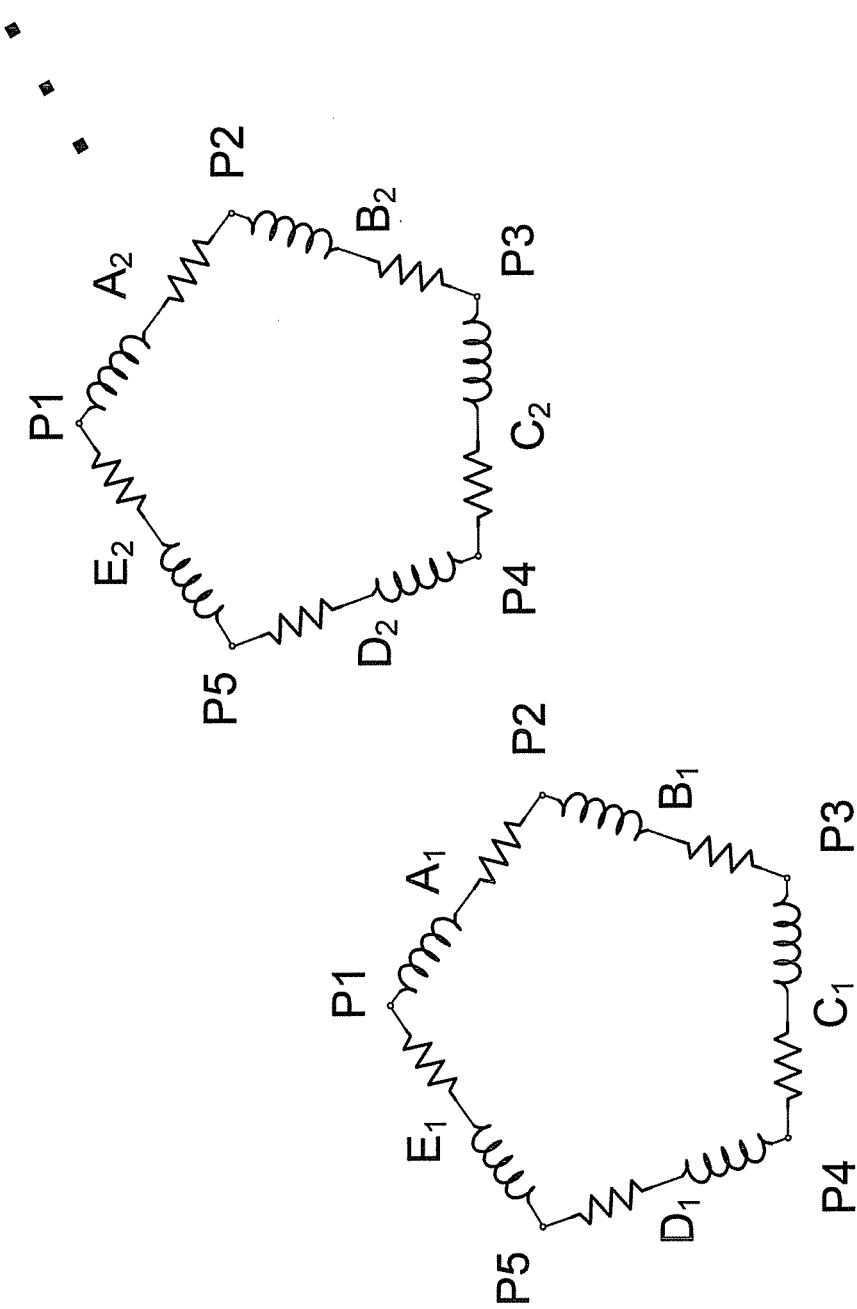
FIG. 4 is a circuit diagram illustrating an exemplary redundant winding connection for multiphase electric machines having five phases according to another embodiment of the subject matter described herein.

FIG. 4 is a circuit diagram illustrating an exemplary redundant winding connection for multiphase electric machines according to another embodiment of the subject matter described herein. FIG. 4 illustrates an embodiment having redundant polygon winding connections for five-phase electric machines. In the embodiment illustrated in FIG. 4, a first redundant winding group that includes coils $A_1$, $B_1$, $C_1$, $D_1$, and $E_1$ are arranged in a pentagon configuration while a second redundant winding group that includes coils $A_2$, $B_2$, $C_2$, $D_2$, and $E_2$ are also arranged in a pentagon configuration. Additional redundant winding groups may exist within the same machine. In the embodiment illustrated in FIG. 4, both redundant winding groups are powered by phases of a five-phase power supply, with phases labeled P1 through P5.

In one embodiment, the same converter supplies power to all of the redundant winding groups. In an alternative embodiment, multiple converters may be used, e.g., where each of the redundant winding groups is supplied power by its own dedicated power supply. In one embodiment, each winding group is powered by a separate converter.

In embodiments where only one of the redundant winding groups operates at a time, upon a failure of one converter, another converter and winding group may activate to provide power to the machine, and the failed converter and its coils may be taken offline or otherwise become dormant. Alternatively, if the first converter partially fails, e.g., one phase of the power supply fails but other phases continue to operate, the second converter may be configured to supply power during the failed phase. In embodiments where both converters provide power simultaneously, the second converter may continue to provide power to coils $A_2$-$E_2$ while the first set of coils $A_1$-$E_1$ continue to operate using whichever output phases of the first converter have not failed.

Like the star configuration illustrated in FIG. 3, in one embodiment, the redundant winding groups may operate together, e.g., they may be powered and active simultaneously. In this configuration, even if of one coil fails, the equivalent coil in the other winding group might be sufficient to allow the machine to continue operating. For example, if coil $C_1$ fails, coil $C_2$ may provide enough power for the machine to continue operating. In one embodiment, the power that is provided to the remaining coils may be reshaped, retimed, or otherwise adjusted to compensate for the failed coil.

In another embodiment, power supplies $PN_1$ and $PN_2$ may be out of phase with each other such that the machine operates as a ten-phase machine, for example. In this configuration, the failure of one coil or power supply phase would leave nine phases remaining, which may be enough to power the machine.

Figure 5:
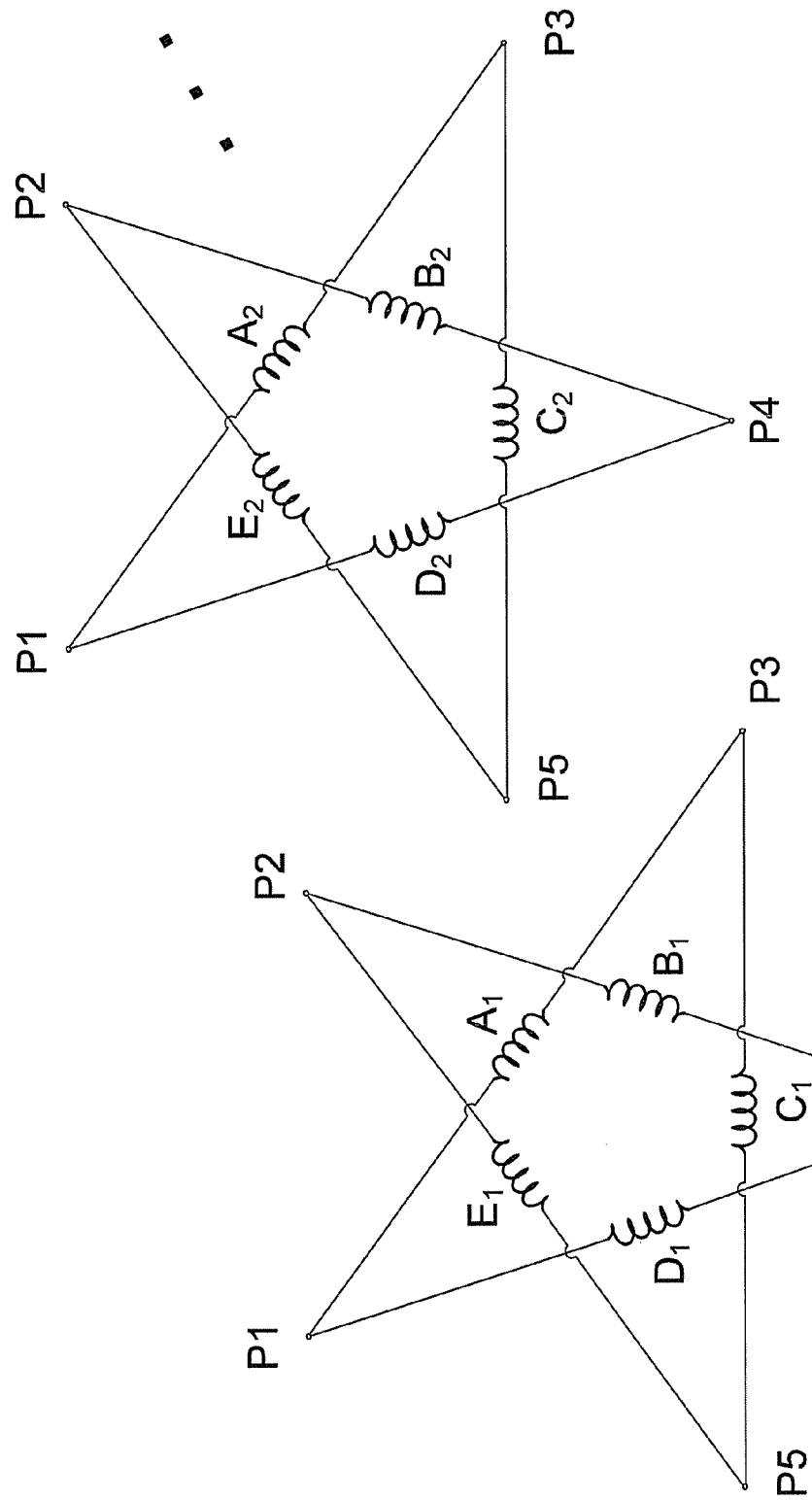
FIG. 5 is a circuit diagram illustrating an exemplary redundant winding connection for multiphase electric machines having five phases according to yet another embodiment of the subject matter described herein.

FIG. 5 is a circuit diagram illustrating an exemplary redundant winding connection for multiphase electric machines according to yet another embodiment of the subject matter described herein. FIG. 5 illustrates an embodiment having redundant pentangle winding connections for five-phase electric machines. Like the embodiment illustrated in FIG. 4, the multiphase machine illustrated in FIG. 5 includes a first winding group that includes coils $A_1$, $B_1$, $C_1$, $D_1$, and $E_1$, and a second winding group that includes coils $A_2$, $B_2$, $C_2$, $D_2$, and $E_2$. In one embodiment, the machine may include 2, 3, 4, or more redundant winding groups.

For simplicity of example, it is assumed that power supply phases P1 through P5 shown in FIGS. 4 and 5 are numbered according to relative phase, e.g., that the phase of power supply P2 is equidistant between the phase of power supply P1 and the phase of power supply P3, the phase of power supply P5 is between the phase of power supply P4 and power supply P1, and so on. In the pentagon configuration illustrated in FIG. 4, coil $A_1$ is connected to power supplies P1 and P2 and coil $B_1$ is connected to supplies P2 and P3. Thus, coils $A_1$ and $B_1$ are connected in series and share a power supply, P2. In the embodiment illustrated in FIG. 5, however, coils $A_N$ and $B_N$ are not connected in series and do not share a power supply. Instead, coil $A_1$ is connected to power supplies P1 and P3 and coil $B_1$ is connected to power supplies P2 and P4.

Like the embodiments illustrated in FIGS. 3 and 4, in one embodiment both redundant winding groups are powered the same power supply, while in another embodiment, each winding group may be powered by its own separate power supply.

Thus, in one embodiment, a single converter supplies all redundant winding groups while in another embodiment, power may be supplied by multiple converters. In one embodiment, each converter supplies one winding group (e.g., a 1-to-1 relationship between converter and winding group) but other converter-to-winding group relationships are contemplated, including 1-to-N, N-to-1, and N-to-N, as well as M-to-N and N-to-M.

In embodiments where only one of the redundant winding groups operates at a time, upon a failure of one converter, another converter and winding group may activate to provide power to the machine, and the failed converter and its coils may be taken offline or otherwise become dormant. Alternatively, if the first converter partially fails, e.g., one phase of the power supply fails but other phases continue to operate, the second converter may be configured to supply power during the failed phase.

In embodiments where both converters provide power simultaneously, the second converter may continue to provide power to coils $A_2$-$E_2$ while the first set of coils $A_1$-$E_1$ continue to operate using whichever output phases of the first converter have not failed. In this configuration, even if of one coil fails, the equivalent coil in the other winding group might be sufficient to allow the machine to continue operating. For example, if coil $C_1$ fails, coil $C_2$ may provide enough power for the machine to continue operating. In one embodiment, the power that is provided to the remaining coils may be reshaped, retimed, or otherwise adjusted to compensate for the failed coil. In another embodiment, power supplies $PN_1$ and $PN_2$ may be out of phase with each other such that the machine operates as a ten-phase machine, for example. In this configuration, the failure of one coil or power supply phase would leave nine phases remaining, which may be enough to power the machine.

Figure 6:
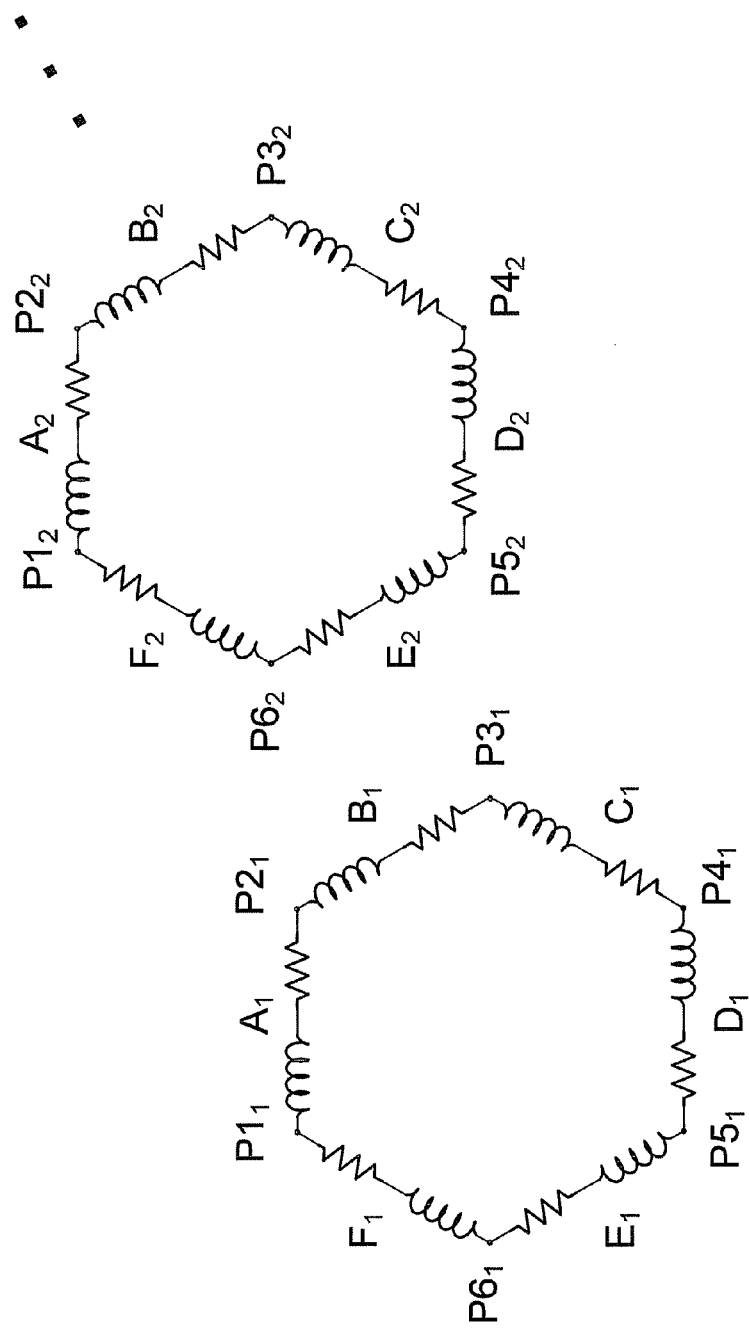
FIG. 6 is a circuit diagram illustrating an exemplary redundant winding connection for multiphase electric machines having six phases according to another embodiment of the subject matter described herein.
Figure 7:
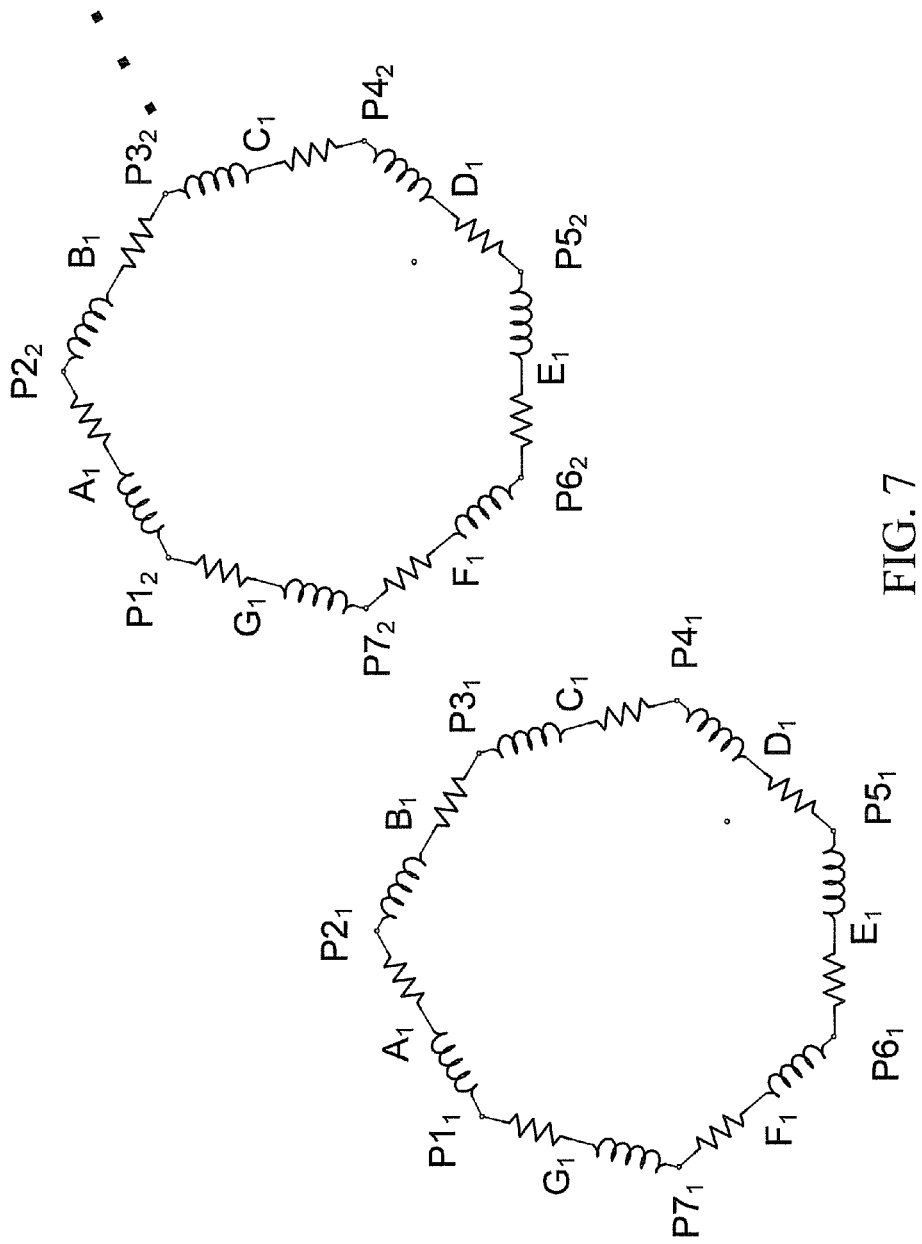
FIG. 7 is a circuit diagram illustrating an exemplary redundant winding connection for multiphase electric machines having seven phases according to another embodiment of the subject matter described herein.

The subject matter described herein for redundant winding connections for multiphase electric machines is not limited to five-phase machines but may be applied to any multiphase machine, as illustrated in FIGS. 6 and 7.

FIG. 6 is a circuit diagram illustrating an exemplary redundant winding connection for multiphase electric machines according to another embodiment of the subject matter described herein. FIG. 6 illustrates an embodiment having redundant polygon winding connections for six-phase electric machines. In the embodiment illustrated in FIG. 6, a first winding group includes coils $A_1$, $B_1$, $C_1$, $D_1$, $E_1$, and $F_1$ wired in series to form a first loop. A second winding group includes coils $A_2$, $B_2$, $C_2$, $D_2$, $E_2$, and $F_2$ wired in series to form a second loop. Other winding groups may be present. The embodiment illustrated in FIG. 6 shows winding groups in a polygon configuration, but in other embodiments, winding groups may be in star or N-angle configurations. In the embodiment illustrated in FIG. 6, for example, in one N-angle configuration, coils $A_1$, $C_1$, and $E_1$ may be wired in series to form a first loop while coils $B_1$, $D_1$, and $F_1$ may be wired in series to form a second loop, creating a structure that topologically resembles a six pointed star. Referring to coil $A_1$, for example, given that one end of $A_1$ is connected to P1, the other end $A_1$ could be connected to ground, i.e., a star configuration, to P2, i.e., a polygon, to P3, i.e., a first type of N-angle, or to P4, i.e. a second type of N-angle. Other configurations are contemplated.

FIG. 7 is a circuit diagram illustrating an exemplary redundant winding connection for multiphase electric machines according to another embodiment of the subject matter described herein. FIG. 7 illustrates an embodiment having redundant polygon winding connections for seven-phase electric machines. In the embodiment illustrated in FIG. 7, a first winding group includes coils $A_1$, $B_1$, $C_1$, $D_1$, $E_1$, $F_1$, and $G_1$, while a second winding group includes coils $A_2$, $B_2$, $C_2$, $D_2$, $E_2$, $F_2$, and $G_2$. Additional winding groups are contemplated. Although the embodiment illustrated in FIG. 7 is a polygon configuration, other configurations are possible, including a star configuration and two different N-angle configurations.

In the embodiment illustrated in FIG. 7, the first winding group is powered by a first set of phases $P1_1$, $P2_1$, $P3_1$, $P4_1$, $P5_1$, $P6_1$, and $P7_1$, while the second winding group is powered by a second set of phases $P1_2$, $P2_2$, $P3_2$, $P4_2$, $P5_2$, $P6_2$, and $P7_2$. In one embodiment, each set of phases may be supplied by separate sources, e.g., the first set of phases may be supplied by one converter while the second set of phases may be supplied by another converter. Alternatively, one converter may supply both or all sets of phases. Other configurations are also contemplated, including having more than one converter supply a winding group, etc. In one embodiment, the two sets of phases may have the same timing, e.g., the phase of $P1_1$ is the same as the phase of $P1_2$. Alternatively, the timing one set of phases relative to the other set of phases may be such that they are offset from one another.

It can be seen that in multiphase electric machines, the options for winding connections are greatly expanded from three-phase machines. Multiphase machines are well suited for applications where high power is desired along with exceptional performance, such as marine applications, wind turbine applications, especially in large direct-drive configurations, and applications where redundancy is attractive, such as traction.

In a machine which has been designed with a large number of phases, one advantage of the subject matter described herein is to reduce the number of parallel converters necessary, while still allowing for the redundant capability of multiple phase groups, as in the case where a single converter drives separate redundant wiring groups. Another advantage of the subject matter described herein is the ability to use multiple converters for a multiphase machine where the number of phases is not divisible by 3.

Figure 8A:
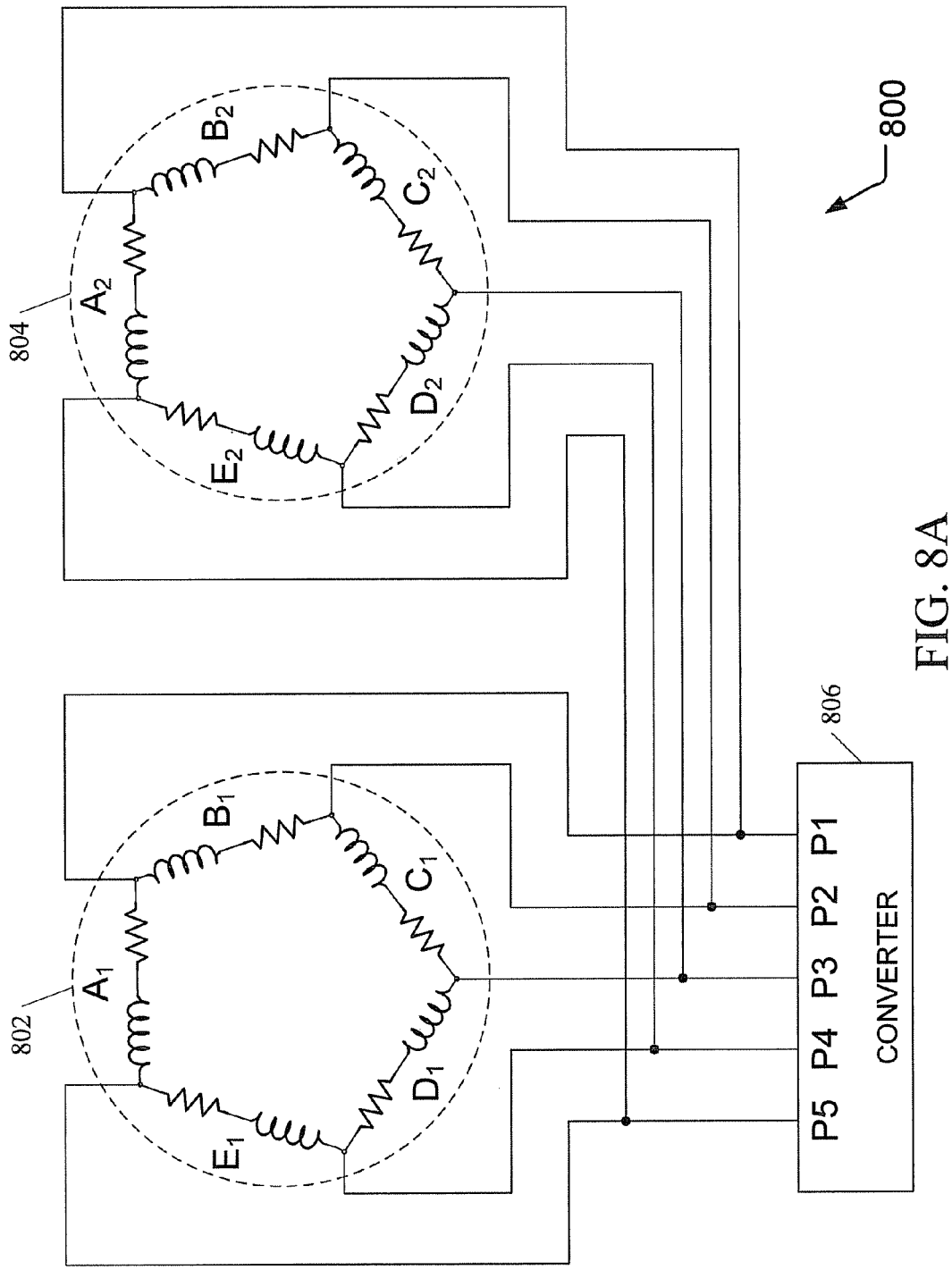
FIG. 8A is a circuit diagram illustrating an exemplary redundant winding connection for a five-phase electric machine according to another embodiment of the subject matter described herein.

FIG. 8A is a circuit diagram illustrating an exemplary redundant winding connection for multiphase electric machines according to another embodiment of the subject matter described herein. FIG. 8A illustrates an embodiment having redundant polygon winding connections for a five-phase electric machine. In the embodiment illustrated in FIG. 8A, machine 800 includes a first set of five coils, $A_1$, $B_1$, $C_1$, $D_1$, and $E_1$, operating as a first winding group 802 in a polygon configuration, and a second set of five coils, $A_2$, $B_2$, $C_2$, $D_2$, and $E_2$, operating as a second winding group 804 in a polygon configuration. Each coil in winding group 802 operates at a different phase from the other coils in the same winding group, and each coil in winding group 804 operates at a different phase from the other coils in the same winding group. Machine 800 also includes a multiphase power supply for providing five phases of power to the respective coils in the first and second winding groups. In one embodiment, multiphase power supply may be a converter 806. In the embodiment illustrated in FIG. 8A, converter 806 may convert a three-phase AC power input into five phases of output, P1 through P5, which are evenly distributed in phase from each other, e.g., P1 is at 0 degrees, P2 is at 72 degrees, P3 is at 144 degrees, P4 is at 216 degrees, and P5 is at 288 degrees.

Figure 8B:
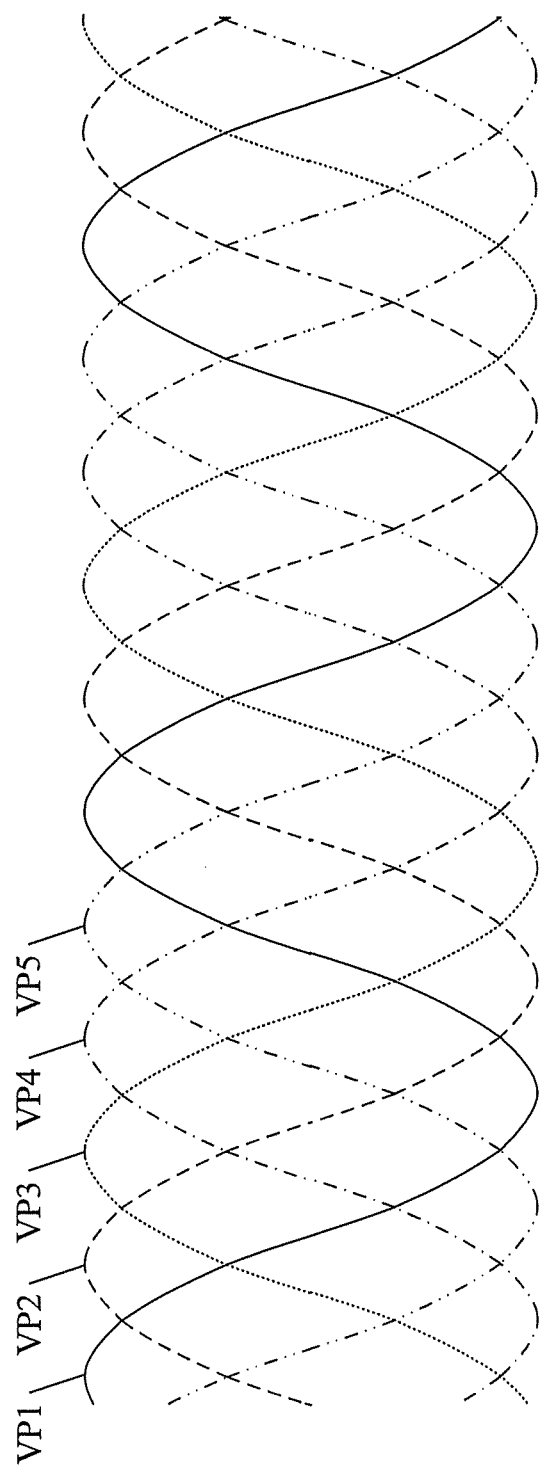
FIG. 8B is a graph illustrating exemplary voltage waveforms of the phases of a five-phase power supply according to an embodiment of the subject matter described herein.

FIG. 8B is a graph illustrating exemplary voltage waveforms of the phases of a five-phase power supply according to an embodiment of the subject matter described herein. FIG. 8B includes a plot of voltage versus time for phases P1 through P5. In the embodiment illustrated in FIG. 8B, each of the five phases are equally distributed across the 360 degrees of a cycle. As stated above, however, a system according to an embodiment of the subject matter described herein may accommodate the failure of one of the phases by adjusting the voltages or timings of the other phases, which may result in waveforms that are dissimilar to the waveforms shown in FIG. 8B.

Referring again to the embodiment illustrated in FIG. 8A, a failure of one of the coils in winding group 802 does not affect the function of winding group 804. In one embodiment, winding group 802 and winding group 804 operate simultaneously during the operation of machine 800. In another embodiment, winding group 802 may be a primary winding group and winding group 804 may be a secondary winding group that is activated in the event that one or more coils of the primary winding group fail. This may be achieved by the use of switches (not shown) that connect and disconnect winding group 804 from converter 806.

Figure 9A:
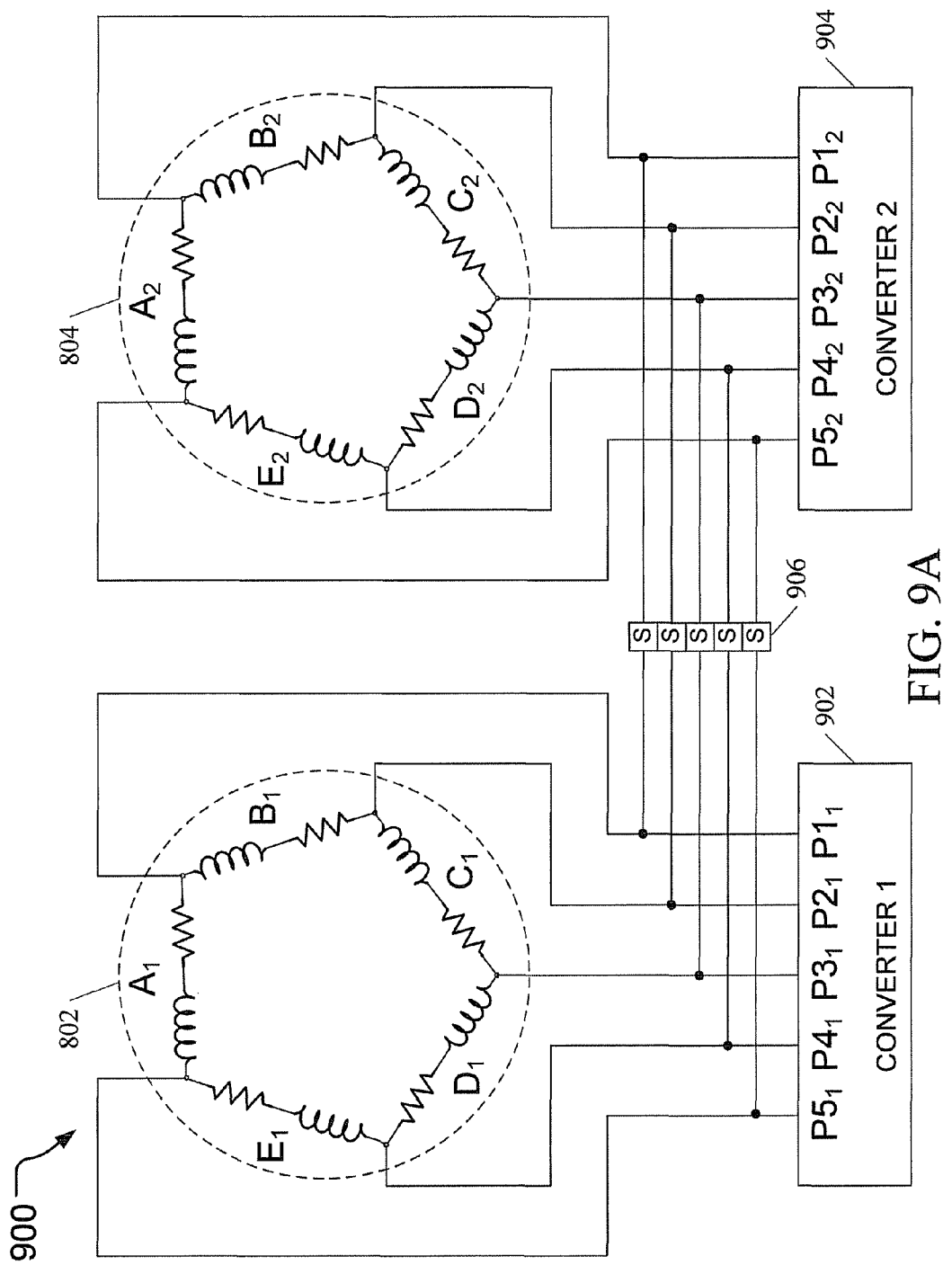
FIG. 9A is a circuit diagram illustrating an exemplary redundant winding connection for a five-phase electric machine according to yet another embodiment of the subject matter described herein.

FIG. 9A is a circuit diagram illustrating an exemplary redundant winding connection for multiphase electric machines according to another embodiment of the subject matter described herein. FIG. 9A illustrates another embodiment having redundant polygon winding connections for a five-phase electric machine. In the embodiment illustrated in FIG. 9A, machine 900 includes first and second winding sets 802 and 804 as shown in FIG. 8A, and therefore their descriptions will not be repeated here. Unlike machine 800, however, in the embodiment illustrated in FIG. 9A, machine 900 has two converters: a first converter 902 provides five-phase power to the first winding set 802 and a second converter 904 provides five-phase power to the second winding set 804. The advantage of this configuration is that it can tolerate not only the failure of one or more coils in one winding set without affecting the other winding set, but it can also tolerate the failure of one or more phases of the converters.

In one embodiment, machine 900 may be configured so that one converter is the primary converter and the other converter is a backup converter that is activated only upon the failure of some or all of the primary converter. In one embodiment, the backup converter may completely replace the failing primary converter. In another embodiment, the backup converter may supplement the remaining working phases or coils of the failing primary converter and winding group, e.g., by activating only those phases and coils of the secondary that correspond to failed phases and coils of the primary.

In another embodiment, both converters operate simultaneously, and the failure of one or more phases of a converter will leave machine 900 with enough coils to allow machine 900 to continue operating. In one embodiment, converters 902 and 904 may coordinate their efforts by compensating for the failure of a phase and/or coil via adjustment of timing or voltage of the remaining working phases. In another embodiment, upon detection of a failure of one or more phases of one of the converters, the failing phase may be supplied by the other converter, such as via an electrical connection or set of switches 906 between each phase of converter 902 and the corresponding phase of converter 904. In this manner, power may be supplied to at least one of the coils of one winding group by the power supply for the other winding group.

In one embodiment, the phases of converter 902 may have the same timing (delay, etc.) of the corresponding phases of converter 904. For example, the timing of phase $P1_1$ would be the same as the timing of phase $P1_2$. In another embodiment, converter 902 may produce phases that are offset from the corresponding phases produced by converter 904, to produce a waveform such as is displayed in FIG. 9B.

Figure 9B:
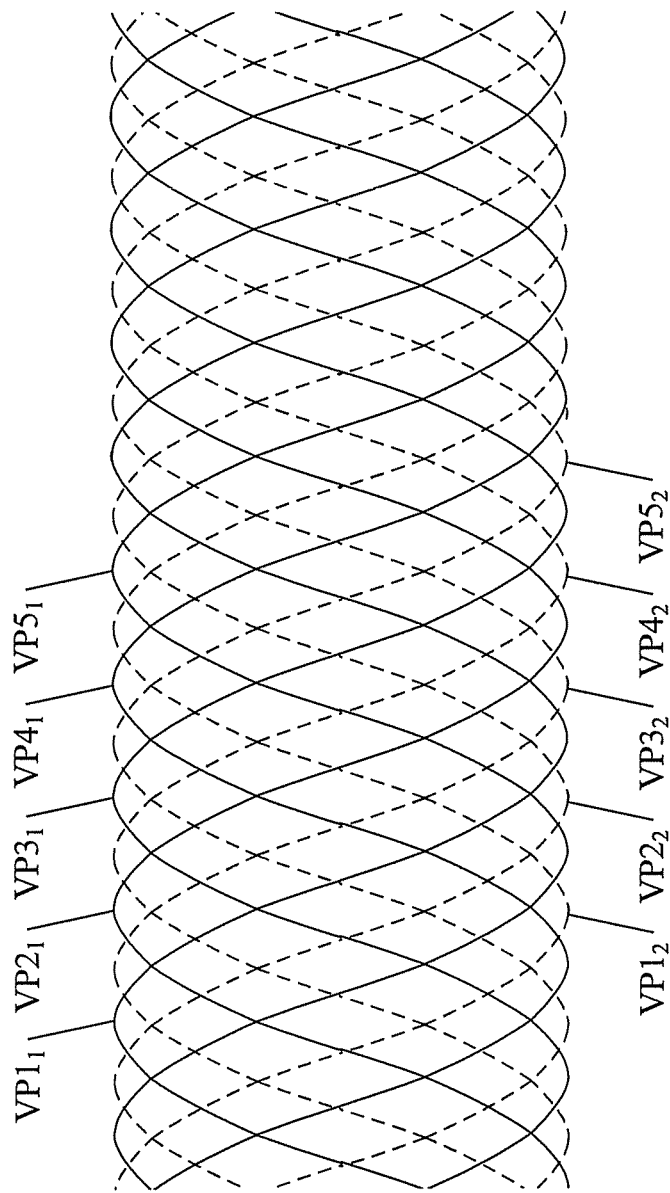
FIG. 9B is a graph illustrating exemplary voltage waveforms of a the phases of a pair of five-phase power supplies according to an embodiment of the subject matter described herein.

FIG. 9B is a graph illustrating exemplary voltage waveforms of the phases of a pair of five-phase power supplies according to an embodiment of the subject matter described herein. FIG. 9B includes a plot of voltage versus time for phases $P1_1$ through $P5_1$ and also phases $P1_2$ through $P5_2$. In the embodiment illustrated in FIG. 9B, each of the five phases $P1_1$-$P5_1$ are equally distributed across the 360 degrees of a cycle. Each of the five phases of $P1_2$-$P5_2$ are likewise equally distributed across the 360 degrees of a cycle. In the embodiment illustrated in FIG. 9B, the phases of $P1_1$-$P5_1$ are 36 degrees off from the phases of $P1_2$-$P5_2$. In this configuration, it can be said that winding groups 802 and 804 operate together to create a ten-phase machine. This general principle can be stated as M number of N phase winding groups may operate as an M×N phase machine. As stated above, however, a system according to an embodiment of the subject matter described herein may accommodate the failure of one of the phases by adjusting the voltages or timings of the other phases, which may result in waveforms that are dissimilar to the waveforms shown in FIG. 9B.

Figure 9C:
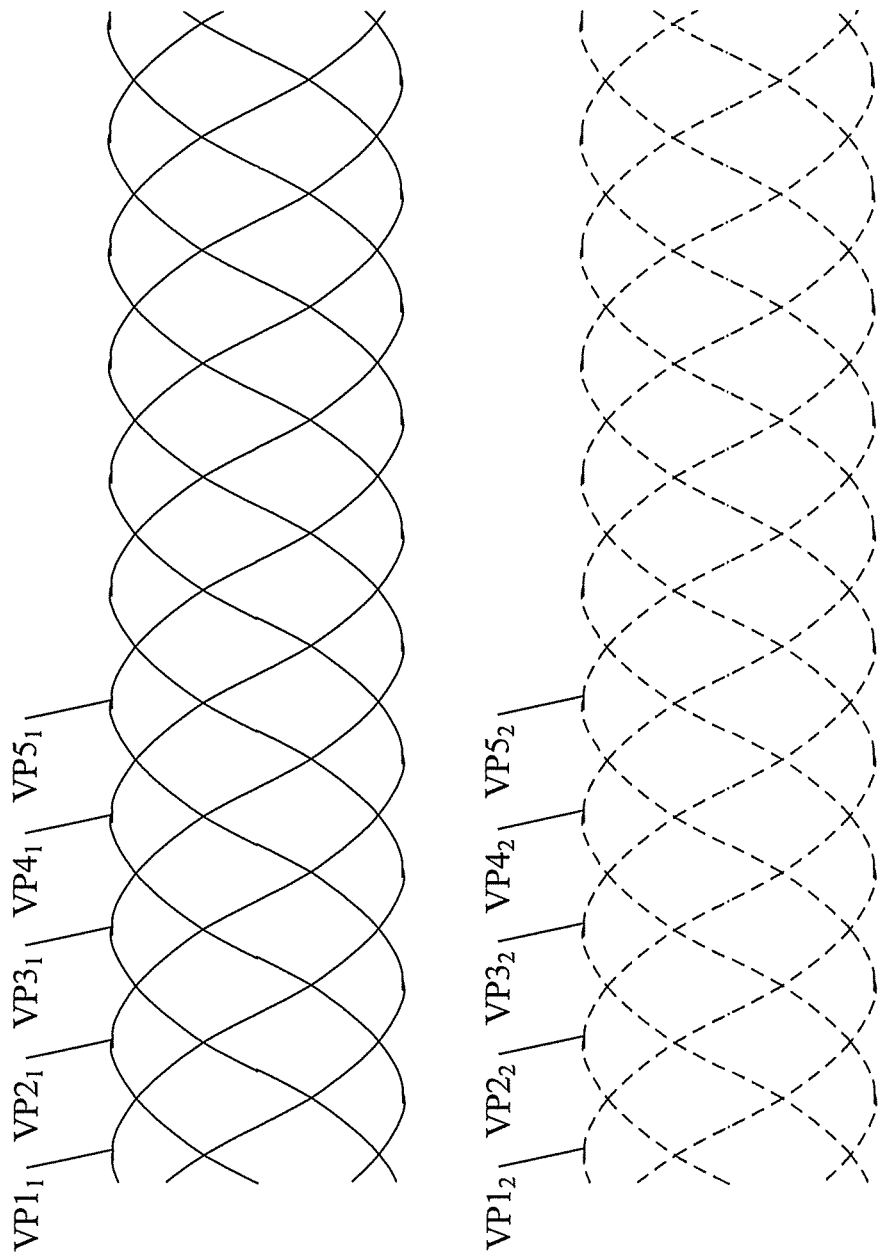
FIG. 9C is a graph illustrating exemplary voltage waveforms of a the phases of a pair of five-phase power supplies according to an embodiment of the subject matter described herein.

FIG. 9C is a graph illustrating exemplary voltage waveforms of a the phases of a pair of five-phase power supplies according to an embodiment of the subject matter described herein. FIG. 9C includes a plot of voltage versus time for phases $P1_1$ through $P5_1$ and also phases $P1_2$ through $P5_2$. In the embodiment illustrated in FIG. 9C, each of the five phases $P1_1$-$P5_1$ are equally distributed across the 360 degrees of a cycle. Each of the five phases of $P1_2$-$P5_2$ are likewise equally distributed across the 360 degrees of a cycle. In the embodiment illustrated in FIG. 9C, however, the phases of $P1_1$-$P5_1$ are exactly or substantially the same as the corresponding phases of $P1_2$-$P5_2$.

Figure 10:
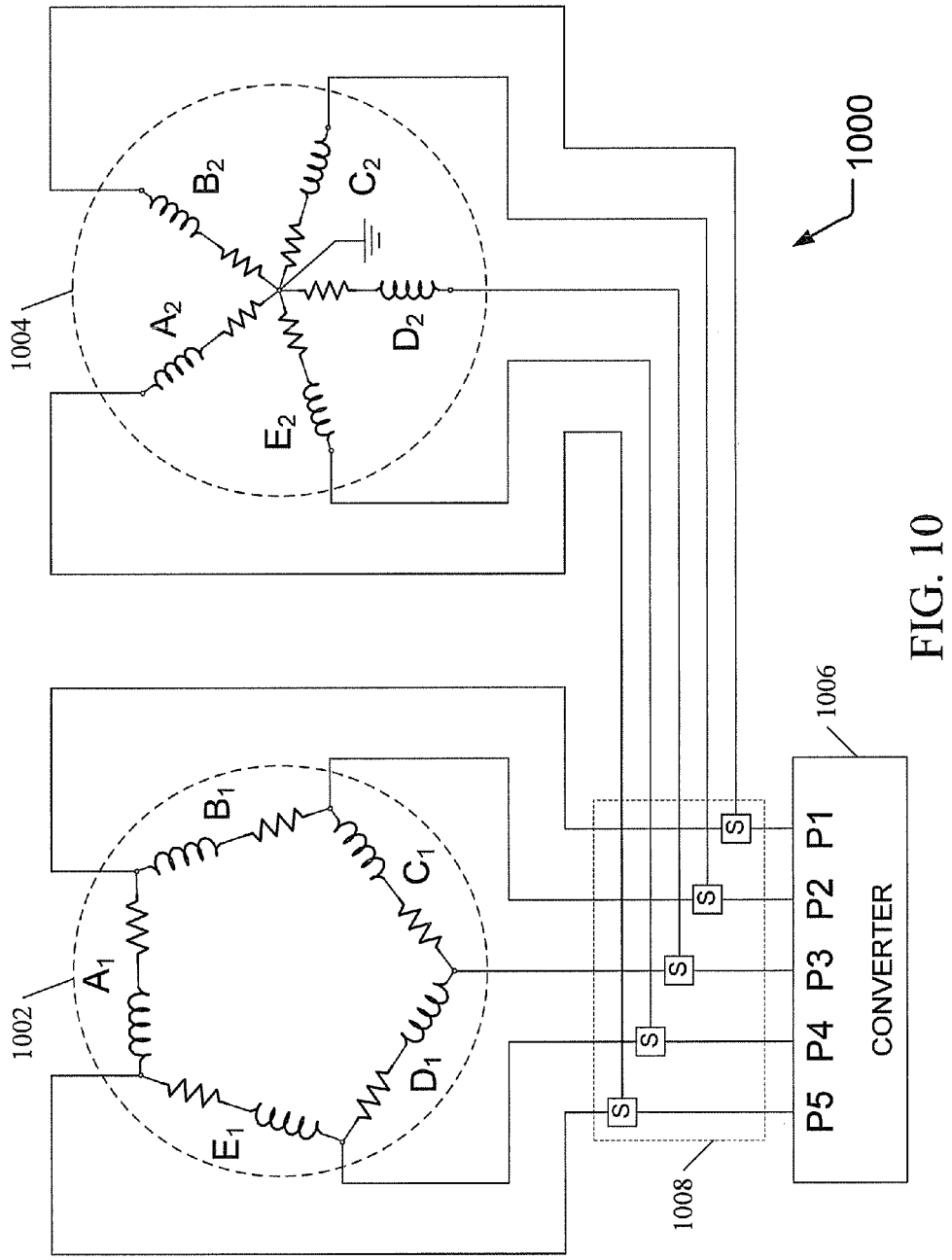
FIG. 10 is a circuit diagram illustrating an exemplary redundant winding connection for multiphase electric machines according to another embodiment of the subject matter described herein.

FIG. 10 is a circuit diagram illustrating an exemplary redundant winding connection for multiphase electric machines according to another embodiment of the subject matter described herein. FIG. 10 illustrates an embodiment having redundant winding connections for a five-phase electric machine, where the winding connections are not the same configuration as each other. In the embodiment illustrated in FIG. 10, machine 1000 includes a first set of five coils, $A_1$, $B_1$, $C_1$, $D_1$, and $E_1$, operating as a first winding group 1002 in a polygon configuration, and a second set of five coils, $A_2$, $B_2$, $C_2$, $D_2$, and $E_2$, operating as a second winding group 1004 in a star configuration. Each coil in winding group 1002 operates at a different phase from the other coils in the same winding group, and each coil in winding group 1004 operates at a different phase from the other coils in the same winding group. In the embodiment illustrated in FIG. 10, machine 1000 also includes a multiphase power supply 1006 for providing five phases of power to the respective coils in the first and second winding groups.

In the embodiment illustrated in FIG. 10, machine 1000 also includes a set of switches 1008, where each switch S connects an output of converter 1006 to winding group 1002 and/or winding group 1004. In this manner, multiphase machine 1000 can select one or the other (or both) of the winding groups 1002 and 1004, depending on which winding configuration is best suited for the situation. Although FIG. 10 illustrates a polygon and a star, other combinations are contemplated, as are machines having more than two winding groups and machines having other numbers of phases greater than 3.

Figure 11:
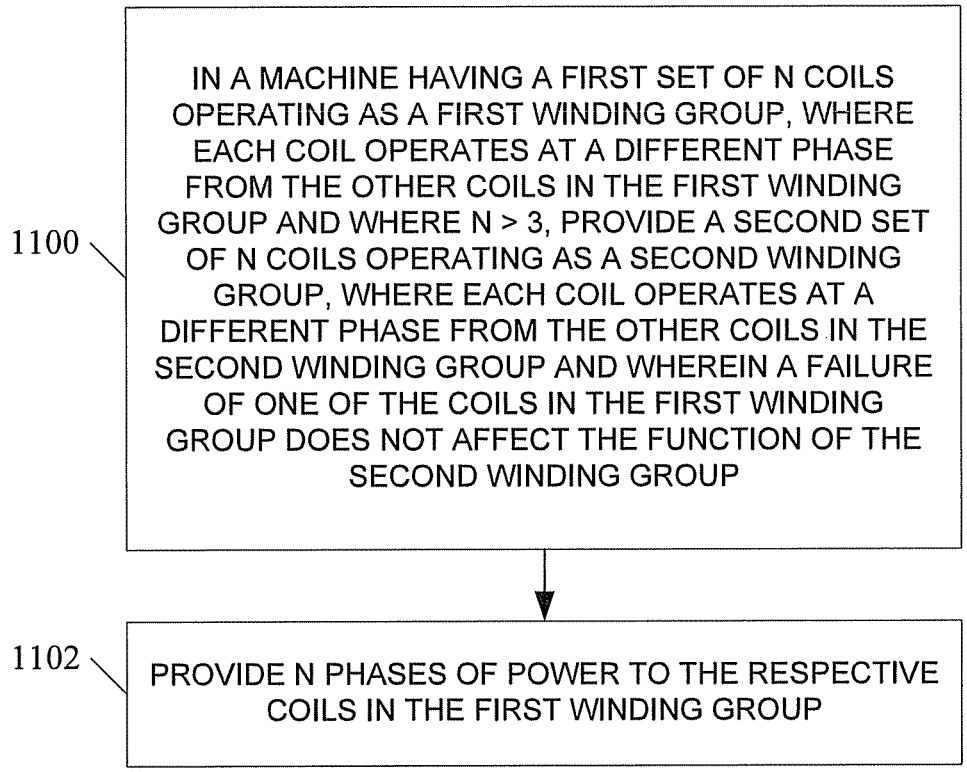
FIG. 11 is a flowchart illustrating an exemplary process for operating a multiphase machine having redundant winding connections according to an embodiment of the subject matter described herein.

FIG. 11 is a flowchart illustrating an exemplary process for operating a multiphase machine having redundant winding connections according to an embodiment of the subject matter described herein. At step 1100, at a machine having a first set of N coils operating as a first winding group, where each coil in the first winding group operates at a different phase from the other coils in the first winding group and where N is an integer greater than three, provide a second set of N coils separate from the first set and operating as a second winding group, wherein each coil in the second winding group operates at a different phase from the other coils in the second winding group and wherein a failure of one of the coils in the first winding group does not affect the function of the second winding group. At step 1102, provide N phases of power to the respective coils in the first set of coils.

Figure 12:
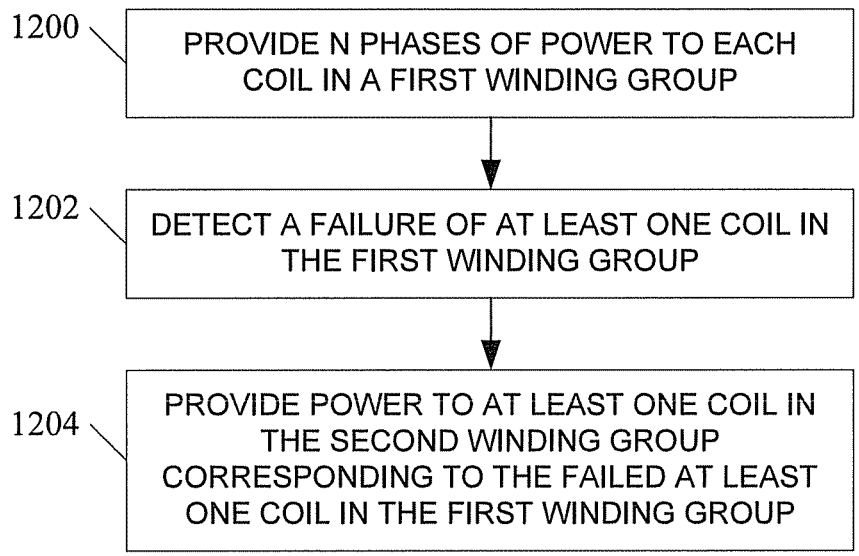
FIG. 12 is a flowchart illustrating an exemplary process for operating a multiphase machine having redundant winding connections according to another embodiment of the subject matter described herein.

FIG. 12 is a flowchart illustrating an exemplary process for operating a multiphase machine having redundant winding connections according to another embodiment of the subject matter described herein.

At step 1200, N phases of power are provided to each coil in a first winding group. Referring to machine 900 in FIG. 9A, for example, converter 1 902 may provide five phases of power to winding group 802. In this example, converter 2 904 is not supplying power to winding group 804, but the subject matter described herein is not so limited.

At step 1202, a failure of at least one of the coils in the first winding group is detected. For example, coil $C_1$ within winding group 802 may fail, and this failure may be detected by converter 1 902, converter 2 904, or another entity within or without machine 900.

At step 1204, power is provided to at least one coil in the second winding group corresponding to the failed coil or coils in the first winding group. For example, converter 2 904 may provide power to winding group 804 sufficient to power the corresponding coil, C. In one embodiment, converter 2 904 may provide power only to phases $P2_2$ and $P3_2$; in an alternative embodiment, converter 2 904 may provide power to phases $P1_2$ through $P5_2$. Other responses are contemplated, including providing full power to some coils within winding group 804 while providing partial or reduced power to other coils within winding group 804, etc.

Figure 13:
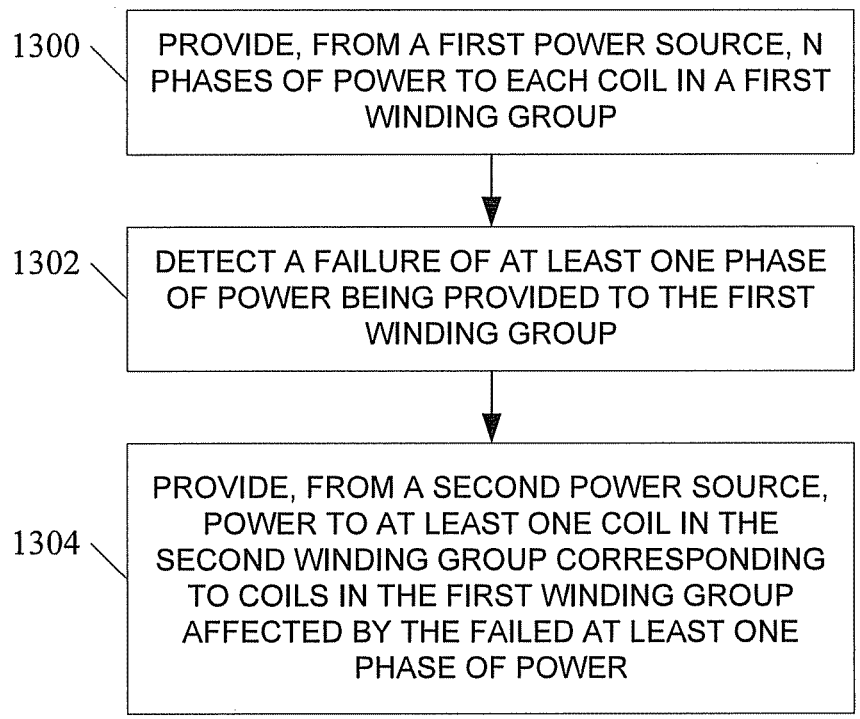
FIG. 13 is a flowchart illustrating an exemplary process for operating a multiphase machine having redundant winding connections according to yet another embodiment of the subject matter described herein.

FIG. 13 is a flowchart illustrating an exemplary process for operating a multiphase machine having redundant winding connections according to yet another embodiment of the subject matter described herein.

At step 1300, N phases of power are provided to each coil in a first winding group. Referring to machine 900 in FIG. 9A, for example, converter 1 902 may provide five phases of power to winding group 802. In this example also, converter 2 904 is not supplying power to winding group 804, but the subject matter described herein is not so limited.

At step 1302, a failure of at least one phase of power being provided to the first winding group is detected. For example, converter 1 902, converter 2 904, or another entity may detect that phase $P5_1$ is not being properly provided to coils $E_1$ and $A_1$ in winding group 802 by converter 1 902.

At step 1304, power is provided to one or more coils in the second winding group that correspond to coils in the first winding group that are affected by the failed power phases. For example, converter 2 904 may provide power phases $P4_2$, $P5_2$, and $P6_2$ to coils $E_2$ and $A_2$ of second winding group 804, or converter 2 904 may provide power to all phases $P1_2$ through $P5_2$. Other responses are contemplated, including providing full power to some coils within winding group 804 while providing partial or reduced power to other coils within winding group 804, etc.

Figure 14:
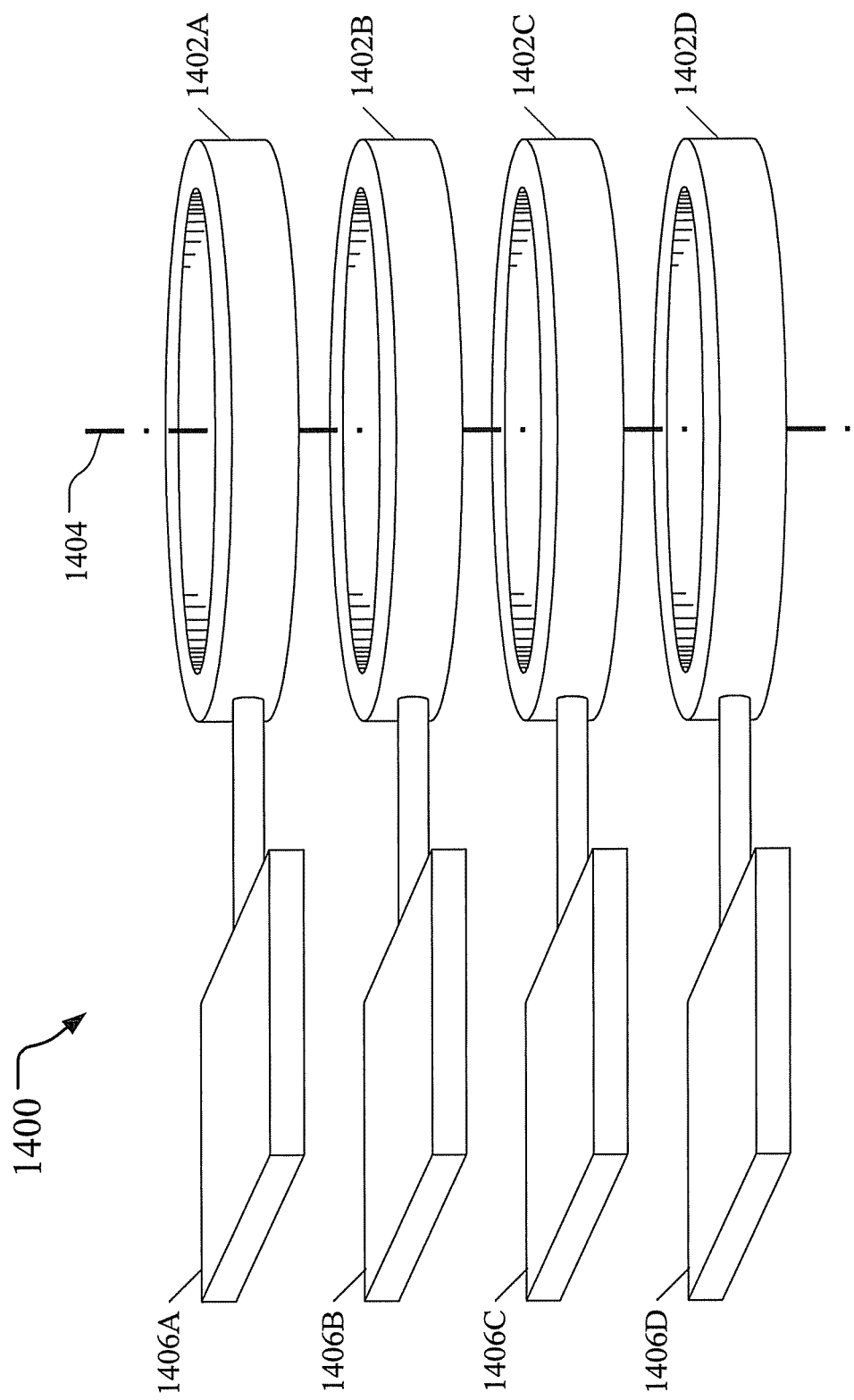
FIG. 14 is a block diagram illustrating an exemplary multiphase machine having redundant winding connections according to another embodiment of the subject matter described herein.

FIG. 14 is a block diagram illustrating an exemplary multiphase machine having redundant winding connections according to another embodiment of the subject matter described herein. FIG. 14 illustrates a 4×N machine 1400 having four redundant winding groups 1402A, 1402B, 1402C, and 1402D arranged side by side along a rotor's axis of rotation 1404. In the simplified view shown in FIG. 14, the rotor, machine casing, brushes or contacts, etc., are omitted for clarity. Each winding group contains N coils, e.g., in a polygon configuration. Each winding group is powered by a dedicated multiphase converter 1406A-D. FIG. 14 illustrates the principle that the redundant winding connections are not limited to just two sets of coils or multiphase power supplies, but may be extended to machines having 3 or more sets of coils and/or multiphase power supplies as well.

In one embodiment, all winding groups 1402A-D may operate simultaneously. In one embodiment, the winding groups may operate in substantially the same phase such that machine 1400 operates as an N-phase machine. In another embodiment, the phases of the winding groups may be staggered or offset such that machine 1400 operates as a 4×N phase machine.

In another embodiment, machine 1400 may be configured such that one or more winding groups are the primary winding groups while one or more of the other winding groups are the backup winding groups that may be activated in response to the failure of one or more coils of a primary winding group and/or one or more phases of the multiphase power supply of a primary winding group.

For example, multiphase power supply 1406A and winding group 1402A may be active during normal operation, and the remaining multiphase power supplies 1406B-D and their corresponding winding groups 1402B-D may be dormant. In the event of a failure of winding group 1402A and/or multiphase power supply 1406A, some or all of the dormant winding groups 1402B-D or multiphase power supplies 1406B-D may be activated to compensate for or replace the failed component.

In another example, multiphase power supplies 1406A and 1406B and their respective winding groups 1402A and 1402B may be active during normal operation. In one embodiment, the active components may operate as a 2×N phase machine. Upon the failure of a component of 1402A, 1402B, 1406A, or 1406B, one or more of the backup power supplies and winding groups may be activated. In one embodiment, multiphase power supplies 1406C and 1406D and their respective winding groups 1402C and 1402D may be activated to continue operation of machine 1400 while multiphase power supplies 1406A and 1406B and their respective winding groups 1402A and 1402B may be deactivated. Other configurations and behaviors are contemplated, including having portions of a backup multiphase power supply or winding group replace the failing portion of the primary multiphase power supply or winding group, and so on.

It should be noted that the processes described in the flowcharts illustrated in FIGS. 11-14 are directed to machines that are operating in motor mode, but corresponding actions may be performed for machines that are operating in generator mode, including activation of redundant coils and/or converters. Using a converter with a generator in this manner is commonly referred to as 'active rectification'. These actions are also within the scope of the subject matter described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A multiphase machine having redundant winding connections, the machine comprising:

a first set of N coils operating as a first winding group, wherein each coil in the first winding group operates at a different phase from the other coils in the first winding group and wherein N is an integer greater than three;

a second set of N coils separate from the first set and operating as a second winding group, wherein each coil in the second winding group operates at a different phase from the other coils in the second winding group and wherein a failure of one of the coils in the first winding group does not affect the function of the second winding group; and at least one multiphase power supply for providing N phases of power to the respective coils in at least one of the first and second winding groups, wherein the at least one multiphase power supply comprises a first N-phase power supply for providing power to the first winding group and a second N-phase power supply for providing power to the second winding group, and wherein the first and second N-phase power supplies provide N-phases of power that are substantially in phase with each other, and wherein, upon the failure of at least one phase of the first N-phase power supply, power is supplied by the second N-phase power supply both to the second winding group and to at least one of the coils of the first winding group, wherein the machine operates in at least one of a generator mode and a motor mode.

2. The multiphase machine of claim 1 wherein the coils in the first set are connected in a star, polygon, or N-angle configuration.

3. The multiphase machine of claim 1 wherein the coils in the first set are connected in one of a star configuration, a polygon configuration, and an N-angle configuration, and wherein the coils in the second set are connected in a same configuration as the coils in the first set or in a different configuration from the coils of the first set.

4. The multiphase machine of claim 1 wherein the failure of the at least one phase of the first N-phase power supply is a wiring failure.

5. The multiphase machine of claim 1 wherein the at least one multiphase power supply comprises at least one converter for providing N-phases of power to at least one of the first and second winding groups.

6. The multiphase machine of claim 1 comprising M sets of N coils, wherein M is greater than or equal to 3, wherein each set of N coils operates as a winding group separate from the other sets of N coils, and wherein the failure of one of the coils in one of the winding groups does not affect the function of the other winding groups.

7. The multiphase machine of claim 1 wherein power is supplied by the second N-phase power supply both to the second winding group and to at least one of the coils of the first winding group by a set of switches between a first converter for the first N-phase power supply and a second converter for the second N-phase power supply.

8. A method for operating a multiphase machine having redundant winding connections, the method comprising:

at a machine having a first set of N coils operating as a first winding group, wherein each coil in the first winding group operates at a different phase from the other coils in the first winding group and wherein N is an integer greater than three, a second set of N coils separate from the first set and operating as a second winding group, wherein each coil in the second winding group operates at a different phase from the other coils in the second winding group and wherein a failure of one of the coils in the first winding group does not affect the function of the second winding group, and wherein the machine comprises at least one multiphase power supply for providing N phases of power to the respective coils in at least one of the first and second winding groups, wherein the at least one multiphase power supply comprises a first N-phase power supply for providing power to the first winding group and a second N-phase power supply for providing power to the second winding group, and wherein the first and second N-phase power supplies provide N-phases of power that are substantially in phase with each other:
- providing N phases of power to the respective coils in the first set of coils to operate the machine in at least one of a generator mode and a motor mode; and
- upon the failure of at least one phase of the first N-phase power supply, supplying power by the second N-phase power supply both to the second winding group and to at least one of the coils of the first winding group.

9. The method of claim 8 comprising detecting the failure of the at least one phase of the first N-phase power supply.

10. The method of claim 9 wherein detecting the failure comprises detecting the failure by one of the first and second N-phase power supplies.

11. The method of claim 8 wherein the coils in the first set are connected in one of a star configuration, a polygon configuration, and an N-angle configuration, and wherein the coils in the second set are connected in a same configuration as the coils in the first set or a different configuration from the coils in the first set.

12. The method of claim 8 wherein providing N phases of power comprises providing N-phases of power from at least one converter.

13. The method of claim 8 comprising:
- providing, at the machine, M sets of N coils, each set operating as a winding group, wherein M is greater than or equal to 3, wherein for each winding group, each coil operates at a different phase from the other coils in the winding group, and wherein a failure of a coil in one of the winding groups does not affect the function of the other winding groups; and
- providing N phases of power to the respective coils in at least one of the sets operating as a winding group.

14. The method of claim 8 wherein supplying power by the second N-phase power supply both to the second winding group and to at least one of the coils of the first winding group comprises supplying power by a set of switches between a first converter for the first N-phase power supply and a second converter for the second N-phase power supply.

* * * * *